(12) United States Patent
Martin et al.

(10) Patent No.: US 11,467,116 B2
(45) Date of Patent: Oct. 11, 2022

(54) FLUIDIC PROPERTY DETERMINATION FROM FLUID IMPEDANCES

(71) Applicant: HEWLETT-PACKARD DEVELOPMENT COMPANY, L.P., Spring, TX (US)

(72) Inventors: Eric Martin, Corvallis, OR (US); Daryl E. Anderson, Corvallis, OR (US); James Michael Gardner, Corvallis, OR (US); James A. Feinn, San Diego, CA (US); Kevin Kaufmann, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 109 days.

(21) Appl. No.: 16/766,633

(22) PCT Filed: Jan. 24, 2018

(86) PCT No.: PCT/US2018/014950
§ 371 (c)(1),
(2) Date: May 22, 2020

(87) PCT Pub. No.: WO2019/147225
PCT Pub. Date: Aug. 1, 2019

(65) Prior Publication Data
US 2021/0010967 A1     Jan. 14, 2021

(51) Int. Cl.
*G01N 27/22* (2006.01)
*G01N 27/12* (2006.01)

(52) U.S. Cl.
CPC ......... *G01N 27/227* (2013.01); *G01N 27/123* (2013.01)

(58) Field of Classification Search
CPC ........................... G01N 27/227; G01N 27/123
See application file for complete search history.

(56) References Cited

U.S. PATENT DOCUMENTS

| 6,204,656 | B1 | 3/2001 | Cheiky-Zelina |
| 9,283,747 | B2 | 3/2016 | Van Brocklin |
| 9,701,128 | B2 | 7/2017 | Arpin |
| 2013/0293246 | A1 | 11/2013 | Pollack |
| 2013/0332085 | A1 | 12/2013 | Yang |
| 2014/0182363 | A1 | 7/2014 | Potyrailo et al. |
| 2014/0287966 | A1 | 9/2014 | Gray et al. |

(Continued)

FOREIGN PATENT DOCUMENTS

| EP | 2420826 A1 * | 2/2012 | ............. H01L 24/13 |
| WO | WO-2013053039 A1 | 10/2012 | |
| WO | WO-2013062516 A1 | 5/2013 | |

(Continued)

*Primary Examiner* — Feba Pothen
(74) *Attorney, Agent, or Firm* — Fabian VanCott (57) ABSTRACT

In one example in accordance with the present disclosure, a fluid analysis system is described. The fluid analysis system includes a fluidic die. The fluidic die includes a fluid chamber to hold a volume of fluid to be analyzed and an impedance sensor disposed within the fluid chamber. The impedance sensor measures an impedance of the fluid in the fluid chamber. The fluid analysis system also includes an evaluator device electrically coupled to the impedance sensor. The evaluator device determines at least one property of the fluid based on the impedance.

20 Claims, 6 Drawing Sheets

(56) References Cited

U.S. PATENT DOCUMENTS

2016/0018381 A1    1/2016  Potyrallo
2016/0334351 A1*  11/2016  Lu ..................... G01N 15/0266

FOREIGN PATENT DOCUMENTS

| WO | WO-2014198428 A1 * | 12/2014 | ............ G01N 27/02 |
| WO | WO-2015189274 A1 | 12/2015 | |
| WO | WO-2016093892 A1 | 6/2016 | |
| WO | WO-2017004160 A1 | 1/2017 | |

* cited by examiner

FLUIDIC PROPERTY DETERMINATION FROM FLUID IMPEDANCES

BACKGROUND

A fluidic die is a component of a fluidic system. The fluidic die includes components that manipulate fluid flowing through the system. For example, a fluidic die includes a fluid chamber to hold fluid to be processed. In some examples, the fluidic die includes actuators to move and/or eject fluid from the fluidic die. For example, in life science applications, biological fluids may be moved through a microfluidic system.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Fluidic dies, as used herein, may describe a variety of types of integrated devices with which small volumes of fluid may be stored, pumped, mixed, analyzed, ejected, etc. One such example of a fluidic system is a micro-fluidic system used in laboratory research where biological fluids can be analyzed and processed. In another specific example, a fluidic die is an ejection die, such as those found in printers, additive manufacturing distributor components, digital titration components, and/or other such devices with which volumes of fluid may be selectively and controllably ejected and/or moved.

As described above, in some examples a fluidic die does not include an actuator. In other examples, a fluidic die does include an actuator. The fluid actuators may move or eject fluid, or may be a part of a fluid measurement/analysis system. Such actuators may be ejecting actuators or non-ejecting actuators such as a pump.

The fluidic die may be a microfluidic die. A microfluidic die is a die of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.).

Examples of fluid actuators include a piezoelectric membrane based actuator, a thermal resistor based actuator, an electrostatic membrane actuator, a mechanical/impact driven membrane actuator, a magneto-strictive drive actuator, or other such elements that may cause displacement of fluid responsive to electrical actuation. A fluidic die may include a plurality of fluid actuators, which may be referred to as an array of fluid actuators.

While such fluidic systems and dies undoubtedly have advanced the field of precise fluid delivery and manipulation, additional developments may further increase their implementation. Specifically, in addition to moving/ejecting fluids, it may be desirable to know properties of the fluid in a microfluidic system. Accordingly, the present specification describes analysis systems and methods that can determine properties of a fluid based on a measured characteristic of the fluid. Specifically, the present specification describes a fluid analysis system. The fluid analysis system includes a feature such as a reservoir, chamber or channel that retains fluid. An impedance sensor is disposed within this fluid retention feature, which sensor has a sensing surface that is exposed to the fluid disposed therein. An electrical stimulus such as a current or voltage may be transmitted to the impedance sensor in the fluidic retention feature. The impedance sensor takes a measurement of the fluid within the fluidic retention feature, which measurement is dependent upon the applied electrical stimulus. This measurement is passed to a controller to determine, from the measurement, any number of fluid properties. In a specific example, the controller determines a real component of the impedance and an imaginary component of the impedance. By separating the real component and imaginary component additional information relating to the properties of the fluid can be ascertained.

Specifically, the present specification describes a fluid analysis system. The fluid analysis system includes a fluidic die. The fluidic die includes 1) a fluid chamber to hold a volume of fluid to be analyzed and 2) an impedance sensor disposed within the fluid chamber. The impedance sensor measures an impedance of the fluid in the fluid chamber. The fluid analysis system also includes an evaluator device electrically coupled to the impedance sensor to determine at least one property of the fluid based on the impedance.

In another example, the fluid analysis system includes the fluidic die and the evaluator device. In this example, the evaluator device determines a real component of the impedance and an imaginary component of the impedance. In this example, the system also includes an electrical stimulus source to supply an electrical stimulus to the impedance sensor in a fluid chamber of the fluidic die.

The present specification also describes a method for determining fluid properties based on fluid impedance. According to the method, at least one electrical stimulus is applied to an impedance sensor in a fluid chamber on a fluidic die and data describing the at least one electrical stimulus is passed to an evaluator device. An impedance sensor measures an impedance of a fluid in the fluid chamber based on the electrical stimulus. From the impedance, a real component and imaginary component are determined. At least one property of the fluid is determined based on 1) at least one of the real component of the impedance and the imaginary component of the impedance and 2) the data describing the at least one electrical stimulus.

In one example, using such a fluidic die 1) allows for fluidic property detection at a micro-fluidic level; 2) provides for simple property determination based on imaginary and/or real components of a sensed impedance; 3) is cost effective as sensor materials are simple and easy to work with.

As used in the present specification and in the appended claims, the term "actuator" refers an actuating ejector and a non-ejecting actuator. For example, an ejector, which is an actuator, operates to eject fluid from the fluid ejection die. A recirculation pump, which is an example of a non-ejecting actuator, moves fluid through the fluid slots, channels, and pathways within the fluid die. Other types of non-ejecting actuators are also possible. For example, a non-ejecting actuator may generate a steam bubble wherein the dynamics of the formation and collapse of the steam bubble can be analyzed to determine fluid properties.

Accordingly, as used in the present specification and in the appended claims, the term "nozzle" refers to an individual component of a fluid ejection die that dispenses fluid onto a surface. The nozzle includes at least an ejection chamber, an ejector actuator, and an opening.

Further, as used in the present specification and in the appended claims, the term "fluidic die" refers to a component of a fluid system that includes components for storing, moving, and/or ejecting fluid. A fluidic die includes fluidic ejection dies and non-ejecting fluidic dies.

As used in the present specification and in the appended claims, the term "a number of" or similar language is meant to be understood broadly as any positive number including 1 to infinity.

Figure 1:
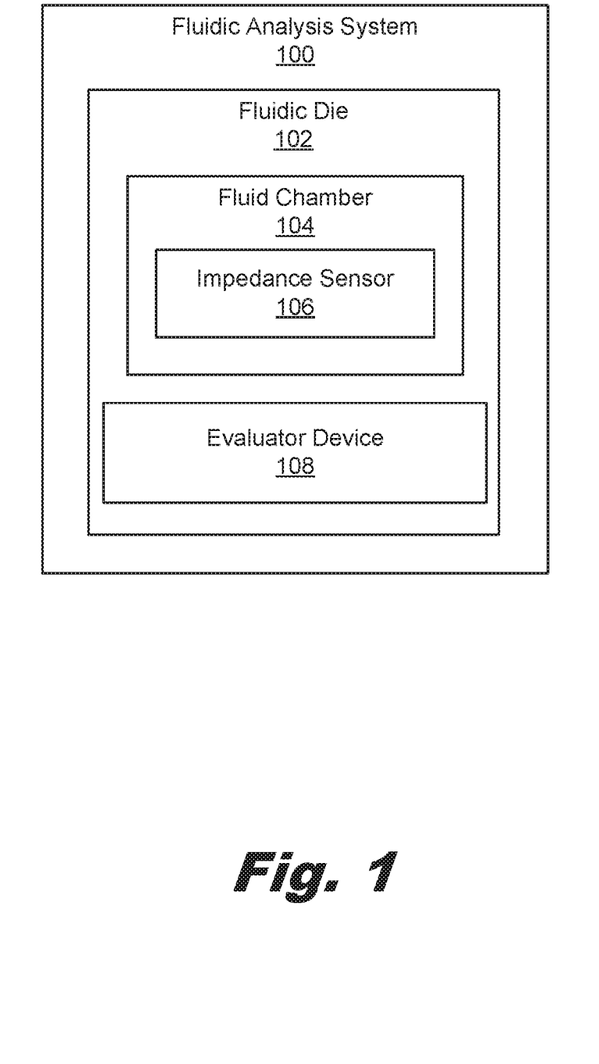
FIG. 1 is a block diagram of a fluid analysis system for determining fluidic properties from fluid impedance, according to an example of the principles described herein.

Turning now to the figures, FIG. 1 is a block diagram of a fluid analysis system (100) for determining fluidic properties from fluid impedance, according to an example of the principles described herein. The fluid analysis system (100) may be used to analyze the properties of any type of fluid. For example, the fluid analysis system (100) may be implemented in a life science application. Accordingly, a biological fluid may be analyzed and/or passed by the fluid analysis system (100). As a specific example, the fluid analysis system (100) may be used to count cells in a particular sample fluid. While specific reference is made to the fluid analysis system (100) being used in a specific life sciences application, the fluid analysis system (100) may be used in other life science applications as well as other applications. For example, the fluid analysis system (100) may be used in a fluid ejection system to analyze a fluid such as ink that is ejected from a die onto a particular surface.

The fluid analysis system (100) includes a fluidic die (102). The fluidic die (102) is part of a fluidic system that houses components for storing fluid, ejecting fluid, and/or transporting fluid along various pathways. For example, the fluidic die (102) may include channels, slots, or other components to move fluid. In some examples, the fluidic die (102) is a microfluidic fluidic die (102). That is, the channels, slots, and reservoirs on the microfluidic die (102) may be on a micrometer, or smaller, scale to facilitate conveyance of small volumes of fluid (e.g., picoliter scale, nanoliter scale, microliter scale, milliliter scale, etc.).

The fluidic die (102) includes a fluid chamber (104) to hold a volume of the fluid to be analyzed. The fluid chamber (104) may take many forms. A specific example of such a fluid chamber (104) is an ejection chamber where fluid is held prior to ejection from a fluidic die (102). In another example, the fluid chamber (104) may be a channel, or conduit through which the fluid travels. In yet another example, the fluid chamber (104) may be a reservoir where a fluid is held.

In some examples, the fluid chambers (104), formed in or on the substrate of the fluidic die (102), include fluid actuators to move fluid throughout the fluidic die (102) or to eject fluid from the fluidic die (102). In one example, the fluid actuator may be an ejector that ejects fluid through an opening of the fluid chamber (104). In another example, the fluid actuator is a fluid pump that, when activated, displaces fluid within the microfluidic channel. These fluid actuators may rely on various mechanism to eject/move fluid. For example, an ejector may be a firing resistor or a piezoelectric device.

An impedance sensor (106) is disposed within the fluid chamber (104). The impedance sensor (106) measures an impedance of the fluid that resides within the fluid chamber (104). That is, the impedance sensor (106) measures the impedance of a fluid ejected from an ejection chamber, held within a reservoir, or that passes by in a fluid channel.

The impedance of a fluid refers to that fluid's opposition to alternating and/or direct current. Impedance can be measured by applying an electrical stimulus, i.e., a voltage or a current, to a sensor in contact with the fluid, and measuring a corresponding output, i.e., current or voltage. Knowing the electrical stimulus applied and the measured output, a value indicating a fluid's impedance can be determined.

Different fluids have different impedances defined by the physical and/or chemical nature of those fluids. Moreover, the same fluid may have a different impedance based on different properties. For example, the temperature of a fluid may alter its impedance. As an additional example, the presence of foreign particles within a fluid may alter a fluid's impedance. Accordingly, knowing a fluid's impedance allows for a determination of a property of the analyzed fluid.

Accordingly, the fluid analysis system (100) also includes an evaluator device (108) that is electrically coupled to the impedance sensor (106). The evaluator device (108) receives the output from the impedance sensor (106) and analyzes it to determine at least one property of the analyzed fluid. That is, for a particular application, the evaluator device (108) may map measured impedance values to particular properties of that fluid. One example of a property of a fluid that may be determined based on the impedance is a fluid temperature. That is, impedance may fluctuate based on a fluid temperature, and a mapping between impedance and temperature may allow the evaluator device (108) to determine a fluidic temperature based on a measured impedance.

As another example, a particulate composition of the fluid may be determined based on the impedance. That is, impedance may fluctuate based on particulate matter, or other foreign objects within a fluid, and a mapping between impedances and particulate matter density for a fluid may allow the evaluator device (108) to determine what, and in what quantity, particulate matter, or other foreign objects are within the fluidic sample. Specifically salt within a fluid may alter the impedance, and a measure of the impedance allows for determination about whether salt is present in the fluid, and in what quantity.

As yet another example, a fluid composition of the fluid may be determined based on the impedance, That is, different fluids may have different impedances. For example, different biological sample fluids may have different impedances from one another, which all may be different from the impedance of a printing fluid. Accordingly, a mapping between impedances and different fluids may allow the evaluator device (108) to distinguish the composition of the fluid that is found within a fluid chamber (104).

As yet another example, a fluid viscosity may be determined based on the impedance. That is, fluids with different viscosities may have different impedances. Accordingly, a mapping between impedances and different fluid viscosities may allow the evaluator device (108) to distinguish what viscosity of a particular fluid is found within a fluid chamber (104).

While specific reference is made to particular properties, any number of fluidic properties may be determined based on the measured impedance. Moreover, while reference is made to determination of a single property at a time, multiple properties may be determined at the same time. For example, a fluid temperature, particulate concentration, fluid composition and/or fluid viscosity may be determined based on a single impedance measurement.

In one specific example, the evaluator device (108) determines such a property by determining real and imaginary components of the impedance. That is, not only may an overall impedance of a fluid change based on different properties, but the real and imaginary components of that impedance may change, to varying degrees, based on different properties for the fluid. Accordingly, by individually determining real and imaginary components of the impedance and using each, either independently or in combination, provide more data wherein fluidic properties can be determined. The additional data allows for greater distinction between particular fluidic properties.

The different components of impedance are determined differently. That is, the characteristics of an applied electrical stimulus are different based on whether a real or imaginary component of impedance is to be sensed. Accordingly, the evaluator device (108) can, depending on the characteristics of the electrical stimulus, determine at least one of a real component of the impedance and an imaginary component of the impedance. In some cases, the evaluator device (108) may determine both components of the impedance, albeit using separate measurement cycles, i.e., distinct outputs from the impedance sensor which distinct outputs correspond to distinct electrical stimuli.

As depicted in FIG. 1, in some examples, the evaluator may be disposed on the die. However, in other examples, as depicted below in FIG. 2, the evaluator device (108) may be disposed off the fluidic die (102) itself, and more specifically off the substrate, which may be silicon, of the fluidic die (102).

Such a fluid analysis system (100) allows for different types of fluids to be analyzed, that is have their properties determined, based on a simple measure of their impedance, and in some cases the real and imaginary components of their impedance. Based on a mapping between one property, or multiple properties of a single or multiple fluids, properties of the fluid that is found within the fluid chamber (104) and which is exposed to the impedance sensor (106) can be determined.

Figure 2:
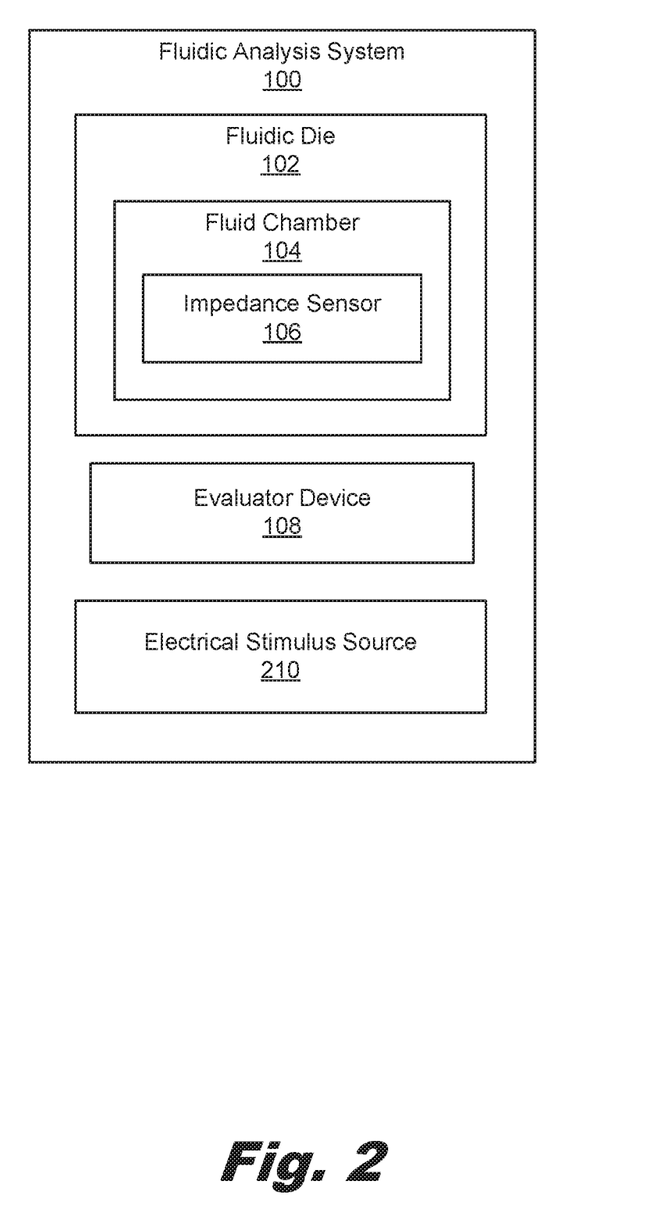
FIG. 2 is a block diagram of a fluid analysis system for determining fluidic properties from fluid impedance, according to another example of the principles described herein.

FIG. 2 is a block diagram of a fluid analysis system (100) for determining fluidic properties from fluid impedance, according to another example of the principles described herein. In the example depicted in FIG. 2, the fluid analysis system (100) includes the fluidic die (102), a fluid chamber (104) disposed on the fluidic die (102) and an impedance sensor (106) disposed within the fluid chamber (104). In this example, as noted above, the evaluator device (108) is depicted as being off of the fluidic die (102). That is, the evaluator device (108) may not be disposed on the silicon substrate of the fluidic die (102).

In this example, the fluid analysis system (100) includes an electrical stimulus source (210). The electrical stimulus source (210) supplies an electrical stimulus to the impedance sensor (106) in the fluid chamber (104) on the fluidic die (102). The electrical stimulus is passed to the impedance sensor (106) such that the impedance sensor (106) can generate an output indicative of the impedance of the fluid.

Data describing the electrical stimulus is passed to the evaluator device (108) such that the evaluator device (108) can determine impedance. That is, the evaluator device (108) uses a known input and a known output to determine the fluid's resistance to current.

The electrical stimulus source (210) may be of varying types. For example, the electrical stimulus source (210) may be a current source which forces current on the impedance sensor (106). In this example, an output of the impedance sensor (106) is a voltage. In another example, the electrical stimulus source (210) is a voltage source that applies a voltage on the impedance sensor (106). In this example, an output of the impedance sensor (106) is a current.

The electrical stimulus source (210) may apply different types of electrical stimulus to the impedance sensor (106). The type that is applied is based on the component of the impedance to be sensed. For example, to measure a real component of the impedance, given a current source, an electrical stimulus, such as a current, may be applied such that any capacitance of the impedance sensor (06) is charged, leaving just an electrical current based on pure resistance. In this example, an output of the impedance sensor (106) has reached a stead state. The output could then be sampled while the electrical stimulus is continually applied.

By comparison, to measure an imaginary, or capacitive, impedance, the electrical stimulus (e.g., current or voltage) is forced onto the impedance sensor (106) for a known amount of time and the output of the impedance sensor (106) is sampled at an end of the predetermined period of time. In yet another example of measuring the impedance, a time-varying electrical stimulus may be used such that the magnitude and phase response of the impedance sensor (106) can be measured.

Figure 3:
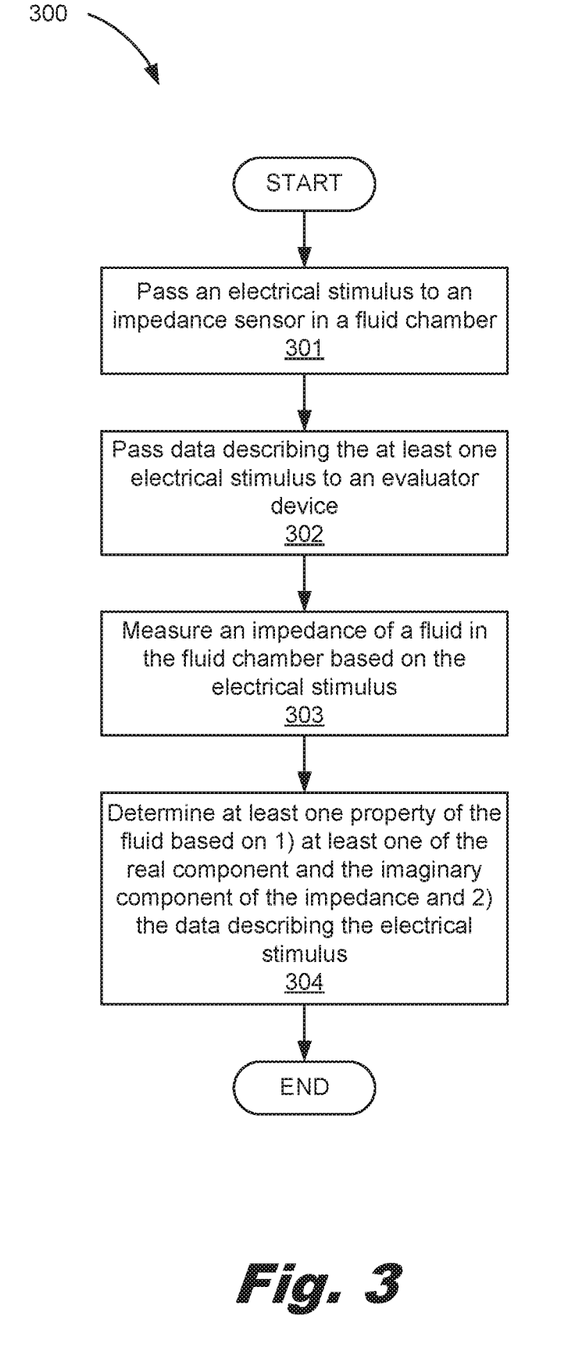
FIG. 3 is a flow chart of a method for determining fluidic properties from fluid impedance, according to an example of the principles described herein.

FIG. 3 is a flow chart of a method (300) for determining fluidic properties from fluid impedance, according to an example of the principles described herein. According to the method (300) at least one electrical stimulus is passed (block 301) to an impedance sensor (FIG. 1, 106) in a fluid chamber (FIG. 1, 104) on a fluidic die (FIG. 1, 102).

Data describing the at least one electrical stimulus is passed (block 302) to the evaluator device (FIG. 1, 108). Such data may include any of a magnitude, duration, and frequency, among other pieces of data that would describe an electrical stimulus such as a voltage or a current.

As described above, determination of a fluid's impedance can be determined knowing an input electrical stimulus and a version of the stimulus modified by a medium. Accordingly, data describing the input electrical stimulus is passed (block 302) to the evaluator device (FIG. 1, 108) thus providing a known input.

Then, using an impedance sensor (FIG. 1, 106), an impedance of the fluid in the fluid chamber (FIG. 1, 104) is measured (block 303). That is, a conducive plate that forms the impedance sensor (FIG. 1, 106) may take a measurement that is reflective of the impedance.

In some examples, the electrical stimulus that is passed (block 301) is selected based on a particular component of impedance. Similarly, that value which is measured by the impedance sensor (FIG. 1, 106) is similarly based on a particular component of the impedance.

For example, for determining a real component of impedance, a direct current electrical stimulus may be passed (block 301) to applied to the impedance sensor (FIG. 1, 106) in the fluid chamber (FIG. 1, 104) such that any capacitance of the impedance sensor (FIG. 1, 106) is fully charged and an output of the impedance sensor (FIG. 1, 106) has reached a steady state. In this example, the output of the impedance sensor (FIG. 1, 106) is sampled, and passed to the evaluator device (FIG. 1, 108) while the electrical stimulus is applied.

By comparison, for determining a capacitive, or imaginary component of impedance, a time-varying electrical stimulus may be passed (block 301) to the impedance sensor (FIG. 1, 106) in the fluid chamber (FIG. 1, 104) having a predetermined magnitude and for a predetermined period of time. In this example, the output of the impedance sensor (FIG. 1, 106) is sampled, and passed to the evaluator device (FIG. 1, 108), at the end of the predetermined period of time.

In some examples, measuring a real component of impedance and an imaginary component of impedance may be performed sequentially such that both pieces of information, may be used to determine a property of the fluid. That is, a first electrical stimulus to measure a real component of impedance may be passed (block 301) and an impedance measured (block 303).

Subsequently, a second electrical stimulus to measure an imaginary component of the impedance may be passed (block 301) and an impedance measured (block 303). In other examples, both measurements could be performed at one time. For example, a current electrical stimulus could be passed and an imaginary component measured during the charging of the impedance sensor (FIG. 1, 106) and then, when a steady state is reached, measuring the real component of the impedance.

With the impedance measured (block 303), at least one property of the fluid can be determined (block 304). Specifically, the at least one property can be determined from 1) either the real component of the impedance, the imaginary component of the impedance or both and 2) the data describing the electrical stimulus. Using both real and imaginary components of the impedance may provide even more criteria by which fluidic properties may be determined. For example, it may be the case that two fluids may have the same resistive impedance, but may have different capacitive impedance. In summary, using the method (300), an electrical impedance is applied, a resulting impedance is measured, and properties determined from the measured impedance.

Figure 4:
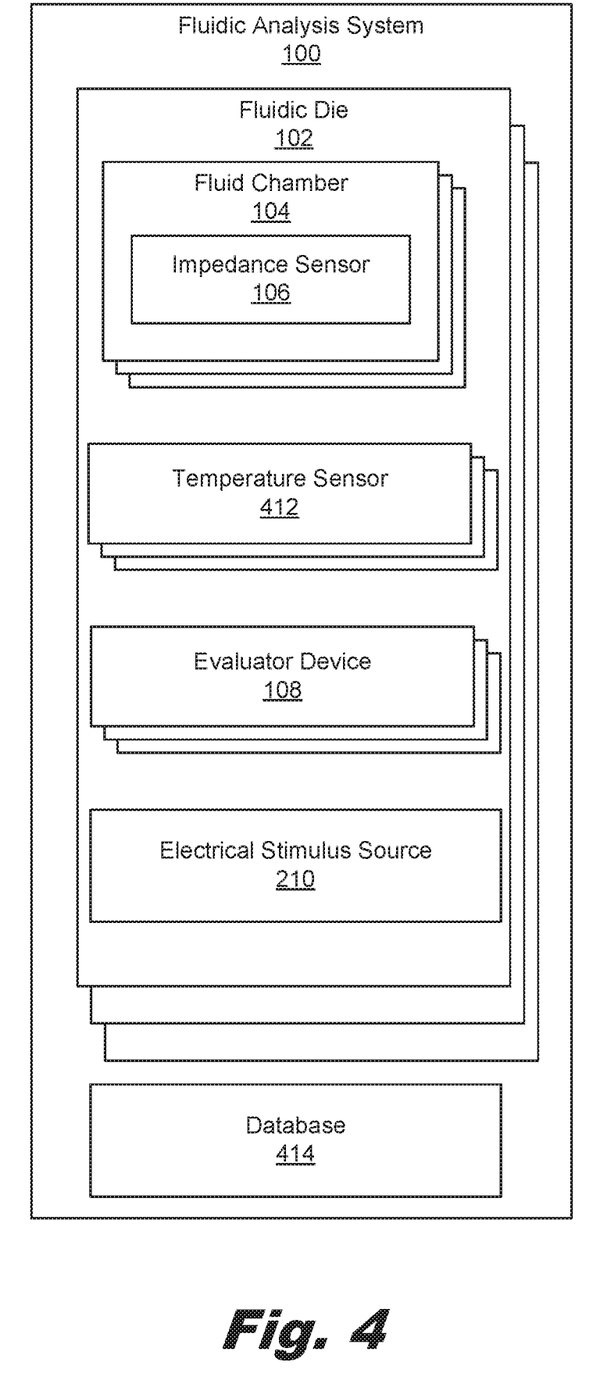
FIG. 4 is a block diagram of a fluid analysis system for determining fluidic properties from fluid impedance, according to another example of the principles described herein.

FIG. 4 is a block diagram of a fluid analysis system (100) for determining fluidic properties from fluid impedance, according to another example of the principles described herein. In this example, the fluid analysis system includes a plurality of fluidic die (102). Each fluidic die (102) having multiple fluid chambers (104) and corresponding impedance sensors (106). With multiple impedance sensors (106) a gradient of the property across the fluidic die (102) can be determined. For example, temperatures, or particulate concentration within a fluid, can be indicated as a gradient across the length of the fluidic die (102).

In this example, the fluidic analysis system (100) may have multiple evaluator devices (108) which may or may not be on the fluidic die (102). Note that the number of each of these components may be different or the same. For example, in some cases, each fluid chamber (104) may have its own evaluator device (108) such that the number of fluid chambers (104) and evaluator devices (108) is the same. In another example the number of evaluator devices (108) is less than the number of fluid chambers (104) such that multiple impedance sensors (106) output measurements of impedance to a shared evaluator device (108).

In this example, the fluidic analysis system (100) includes at least one electrical stimulus source (210). FIG. 4 depicts the electrical stimulus source (210) being disposed on the fluidic die (402), however in some examples it may be off the fluidic die (402). In this example, multiple evaluator devices (108) may be coupled to the electrical stimulus source (210). That is, a shared electrical stimulus source (210) may pass electrical stimuli to multiple impedance sensors (106). In this example, the fluid analysis system (100) includes a network of switches through which electrical stimuli can be passed to desired impedance sensors (106). The network of switches would also regulate to which evaluator devices (108) impedance sensor measurements and data describing the electrical stimulus are passed.

In this example, the fluid analysis system also includes a temperature sensor (412) to measure a temperature of the substrate of the fluidic die (102). Accordingly, the temperature sensor(s) (412) may be disposed on, or embedded in, the fluidic die (102). A temperature sensor (412) may take various forms. For example, a temperature sensor (412) may be a thermal sense resistor (TSR) that spans the length of the fluidic die (102) and takes an aggregate temperature of the substrate. In this example, the number of temperature sensors (412) is less than the number of fluid chambers (104).

In another example, the number of temperature sensors (412) may be the same as the number of fluid chambers (104). For example, a diode thermal sensor may be placed near, or in, the fluid chamber (104). In other words, in this example, each fluid chamber (104) may have a unique diode temperature sensor (412). In another example, multiple fluid chambers (104) may be paired with a single diode temperature sensor (412). In this example, the temperature sensor (412) measures the temperature of the substrate and/or fluid, and the raw impedance measurements from the impedance sensor (106) and the temperature measured by the temperature sensor (412) can be used to more accurately identify characteristics or properties of the fluid.

In some examples, the fluid analysis system (100) includes a database (414). The database (414) includes a mapping between real and imaginary components of impedance and the at least one property. In some specific examples, the mapping may be between distinct components, i.e., real and imaginary, of the impedance and the at least one property. That is, once an impedance sensor (106) measures a particular impedance component, be it real or imaginary, output values related to these measurements are identified in the database (414), which database (414) correlates the output to a known property of the fluid. That is, the database (414) may map different values of real components of impedance and/or different values of imaginary components of impedance and initial electrical stimuli with different propert(ies) of fluid(s), or to different values of the different properties. Accordingly, with a known initial electrical stimulus and known impedance responses for that electrical stimulus, the evaluator device (108) can determine the properties of that particular fluid.

Figure 5:
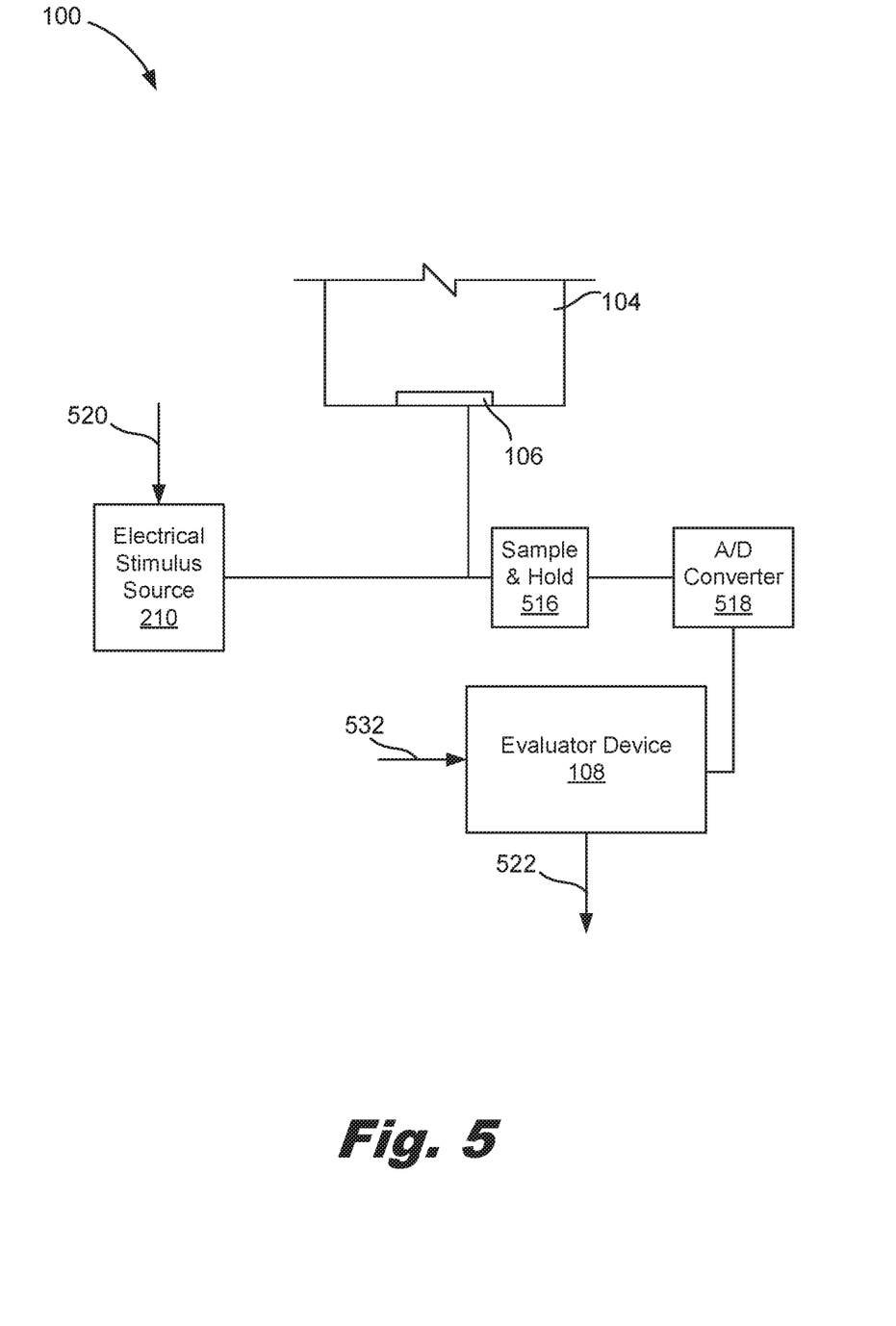
FIG. 5 is a diagram of a fluid analysis system for determining fluidic properties from fluid impedance, according to another example of the principles described herein.

FIG. 5 is a diagram of a fluid analysis system (100) for determining fluidic properties from fluid impedance, according to another example of the principles described herein. As described above, the fluid analysis system (100) includes a fluid chamber (104) in which fluid to be analyzed is disposed. Inside the fluid chamber (104) is an impedance sensor (106) which determines an impedance of the fluid disposed therein.

Also, as described above, the electrical stimulus source (210) forces an electrical stimulus, be it a current or voltage, onto the impedance sensor (106). In this example, with the impedance sensed, an output of the impedance sensor (106) is passed to a sample and hold circuit (516) that captures an output, be it a voltage or current and holds its value at a constant level for a specified period of time. This sampled output is then passed to an A/D converter (518) that converts the analog output into a signal usable by the evaluator device (108). For example, the A/D converter may convert the analog value into a digital word. The evaluator device (108) may use this digital word, along with data (523) describing the electrical stimulus, to identify, from a database (FIG. 4, 414) various properties for the fluid. An output (522) of the evaluator device (108) is indicative of the property, which output can be used to carry out any number of operations within the application in which the fluid analysis system (100) is used.

In some examples the electrical stimulus source (210) may be controlled by a source control signal (520), The source control signal activates the electrical stimulus source (210) to pass the electrical stimuli to the impedance sensor (106) and the evaluator device (108).

Moreover, as described above, data (523) describing the electrical stimulus is provided to the evaluator device (108) such that a determination of a property can be made.

As described above, the fluid analysis system (100) senses the shape of the output voltage (or current) curve that results from an electrical stimulus (of current, or voltage, respectively) applied to the impedance sensor (106). The shape of the output voltage or current can be sensed (in part) by taking a measurement at a specific time as the voltage/current is rising. For example, the fluid analysis system (100) may be used to determine a health of an ink. In this example, good fluid may have a signal of 2.5 v at 1 uS after a 1 mA pulse is applied, at 60 degrees C. and 2.8 v at 70 degrees C. Additional data points may be used as well. With this data, the fluid analysis system (100) can discern "good" ink from "bad" ink. In other words, not only does the fluid analysis system (100) determine a real and complex impedance, but also determines a transient response to an electrical stimulus by taking impedance measures after a predetermined period of time.

Figure 6:
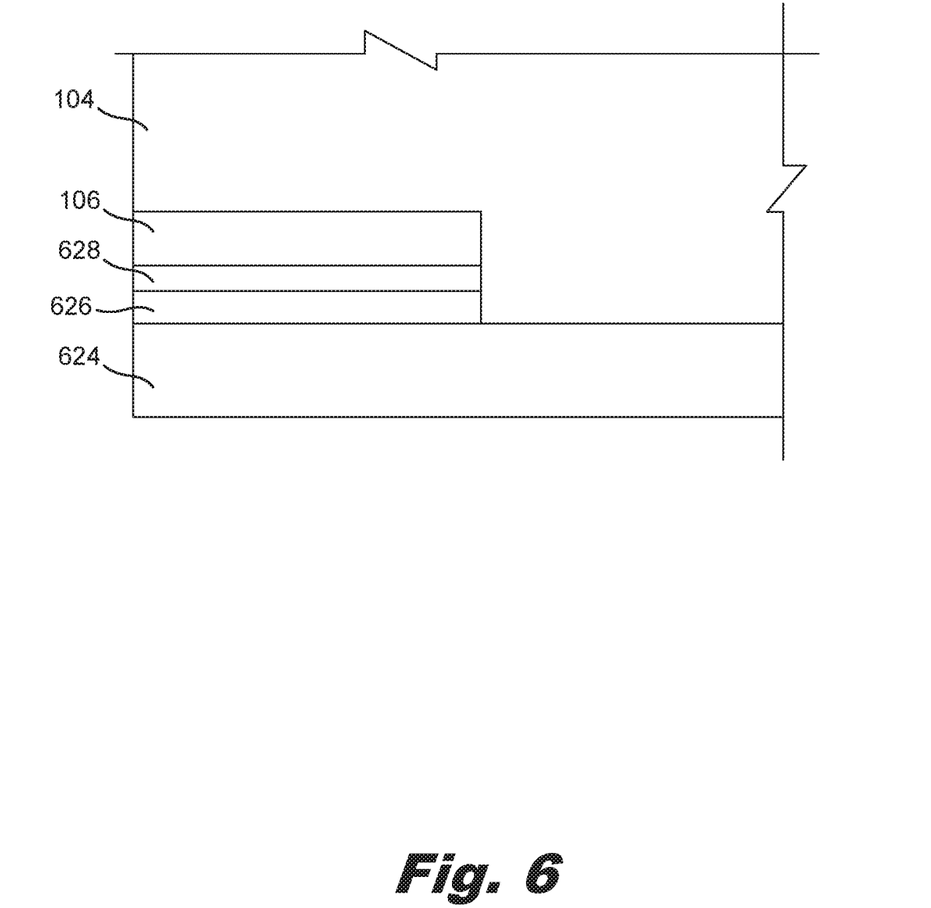
FIG. 6 is a side view of an impedance sensor in a fluid analysis system for determining fluidic properties from fluid impedance, according to another example of the principles described herein.

FIG. 6 is a side view of an impedance sensor (106) of a fluid analysis system (FIG. 1, 100) for determining fluidic properties from fluid impedance, according to another example of the principles described herein. As described, the impedance sensor (106) is disposed within a fluid chamber (104). While FIG. 6 depicts the impedance sensor (106) on a bottom surface of the fluid chamber (104), the impedance sensor (106) may take other shapes, such as a pillar and may be on other surfaces, such as a sidewall of the fluid chamber (104).

The impedance sensor (106) may be disposed on a passivation layer (628), which passivation layer (628) is disposed on an actuator (626) which is disposed on a substrate (624) of the fluidic die (FIG. 1, 102). The substrate (624) refers to a surface in which various components of the fluidic die (624) are formed. The substrate (624) may include various layers including a silicon layer in which fluid chambers (104) are disposed.

Structurally the impedance sensor (106) may include a single electrically conductive layer, formed of a material such as tantalum or aluminum, which can detect an impedance of whatever medium is within the fluid chamber (104). Specifically, each impedance sensor (106) measures an impedance of the medium within the fluid chamber (104), which impedance measurement, as described above, can be used, either alone or in conjunction with a temperature sensor (FIG. 4, 412) to determine properties of the fluid within the fluid chamber (104).

In one example, using such a fluidic die 1) allows for fluidic property detection at a micro-fluidic level; 2) provides for simple property determination based on imaginary and/or real components of a sensed impedance; 3) is cost effective as sensor materials are simple and easy to work with.

What is claimed is:

1. A fluid analysis system, comprising:
an electrical stimulus source to supply an electrical stimulus to an impedance sensor in a fluid chamber, wherein characteristics of the electrical stimulus are based on which of a real and imaginary component of impedance is to be sensed;
a fluidic die comprising:
the fluid chamber to hold a volume of fluid to be analyzed; and
the impedance sensor disposed within the fluid chamber to measure the impedance of the fluid in the fluid chamber; and
an evaluator device electrically coupled to the impedance sensor to:
determine a real component of the impedance;
determine an imaginary component of the impedance; and
determine at least one property of the fluid based on the impedance, wherein:
a first property of the fluid is to be determined based on the real component of the impedance and data describing the electrical stimulus; and
a second property of the fluid is to be determined based on the imaginary component of the impedance and data describing the electrical stimulus.

2. The fluid analysis system of claim 1, wherein:
the electrical stimulus source is a current source to force different currents on the impedance sensor based on a component to be determined; and
an output of the impedance sensor is a voltage which is based on the component to be determined and a forced current.

3. The fluid analysis system of claim 1, wherein:
the electrical stimulus source is a voltage source that applies different voltages on the impedance sensor based on a component to be determined; and
an output of the impedance sensor is a current which is based on the component to be determined and an applied voltage.

4. The fluid analysis system of claim 1, further comprising a database comprising a mapping between real and imaginary components of impedance and the at least one fluid property.

5. The fluid analysis system of claim 1, wherein the evaluator device is disposed on the fluidic die.

6. The fluid analysis system of claim 1, wherein the evaluator is disposed off the fluidic die.

7. A fluid analysis system, comprising:
an electrical stimulus source to supply an electrical stimulus to an impedance sensor in a fluid chamber on a fluidic die, wherein characteristics of the electrical stimulus are based on which of a real and imaginary component of impedance is to be sensed;

the fluidic die, wherein the fluidic die comprises:
the fluid chamber to hold a volume of fluid to be analyzed; and
the impedance sensor affixed within the fluid chamber to measure the impedance of the fluid in the fluid chamber based on the electrical stimulus; and an evaluator device to:
determine a real component of the impedance;
determine an imaginary component of the impedance; and
determine a first property of the fluid based on the real component of the impedance and data describing the electrical stimulus; and
determine a second property of the fluid based on the imaginary component of the impedance and data describing the electrical stimulus.

8. The fluid analysis system of claim 7, wherein the impedance sensor comprises a conductive metal layer disposed on a passivation layer.

9. The fluid analysis system of claim 8, wherein the conductive metal layer is formed from at least one of tantalum and aluminum.

10. The fluid analysis system of claim 7, wherein:
the fluidic die further comprises a temperature sensor to measure a temperature of a substrate of the fluidic die; and
the evaluator device is to determine the at least one property of the fluid further based on the measured temperature of the substrate.

11. The fluid analysis system of claim 10, wherein the first property and second property comprise a property selected from the group consisting of:
a fluid temperature;
particulate composition of the fluid;
fluid composition;
concentration of component of the fluid; and
fluid viscosity.

12. A method, comprising:
passing at least one electrical stimulus to an impedance sensor in a fluid chamber on a fluidic die, wherein characteristics of the at least one electrical stimulus are based on which of a real and imaginary component of impedance is to be sensed;
passing data describing the at least one electrical stimulus to an evaluator device;
measuring, with the impedance sensor, an impedance of a fluid in the fluid chamber based on the at least one electrical stimulus;
determining a real component of the impedance;
determining an imaginary component of the impedance; and
determining at least one property of the fluid based on the impedance, wherein:
a first property of the fluid is to be determined based on the real component of the impedance and data describing the electrical stimulus; and
a second property of the fluid is to be determined based on the imaginary component of the impedance and data describing the electrical stimulus.

13. The method of claim 12, wherein:
when determining the real component of the impedance:
the electrical stimulus is applied such that a capacitance of the impedance sensor is charged and an output of the impedance sensor has reached a steady state; and
the method further comprises sampling the output while the electrical stimulus is applied; and
when determining the imaginary component of the impedance:
the electrical stimulus is applied for a predetermined period of time; and
the method further comprises sampling the output at the end of the predetermined period of time.

14. The fluid analysis system of claim 1, wherein the impedance sensor is to measure a real component of the impedance and an imaginary component of the impedance in subsequent measurement cycles.

15. The fluid analysis system of claim 1, wherein the impedance sensor is to measure a real component of the impedance and an imaginary component of the impedance at one time.

16. The fluid analysis system of claim 15, wherein:
the electrical stimulus is a current electrical stimulus; and
the impedance sensor is to measure the real component of the impedance and then imaginary component of the impedance at one time by:
measuring the imaginary component during charging of the impedance sensor; and
measuring the real component of the impedance when a steady state is reached.

17. The fluid analysis system of claim 1, wherein the impedance sensor measures the impedance as the electrical stimulus is rising.

18. The fluid analysis system of claim 7, wherein the electrical stimulus source applies different types of electrical stimulus to the impedance sensor.

19. The fluid analysis system of claim 7, wherein the fluidic die comprises multiple impedance sensors in the fluid chamber to determine a gradient of the first property or the second property across a length of the fluidic die.

20. The fluid analysis system of claim 7, wherein the evaluator device is to determine a transient response of the impedance.

* * * * *